United States Patent [19]

Bolie

[11] 4,204,805

[45] May 27, 1980

[54] VERTICAL AXIS WIND TURBINE

[76] Inventor: Victor W. Bolie, 7504 American Heritage Dr., Northwest, Albuquerque, N. Mex. 87109

[21] Appl. No.: 890,998

[22] Filed: Mar. 28, 1978

[51] Int. Cl.² .............................................. F03D 7/06
[52] U.S. Cl. .................................... 416/119; 416/117; 416/197 A
[58] Field of Search ................... 416/197 A, 119, 111, 416/242, 117, 23

[56] References Cited

U.S. PATENT DOCUMENTS

| | | | |
|---|---|---|---|
| 1,443,912 | 1/1923 | Dominguez | 416/142 X |
| 4,048,947 | 9/1977 | Sicard | 416/119 X |
| 4,052,134 | 10/1977 | Rumsey | 416/140 X |
| 4,082,479 | 4/1978 | Rangi | 416/41 X |
| 4,087,202 | 5/1978 | Musgrove | 416/132 B X |
| 4,105,363 | 8/1978 | Loth | 416/140 X |
| 4,115,027 | 9/1978 | Thomas | 415/2 |
| 4,130,380 | 12/1978 | Kaiser | 416/197 A |

FOREIGN PATENT DOCUMENTS

| | | | |
|---|---|---|---|
| 860930 | 12/1952 | Fed. Rep. of Germany | 416/119 |
| 929721 | 1/1948 | France | 416/119 |
| 944152 | 3/1949 | France | 416/111 |
| 2252769 | 6/1975 | France | 416/119 |

*Primary Examiner*—Everette A. Powell, Jr.
*Attorney, Agent, or Firm*—Head & Johnson

[57] ABSTRACT

An improved type of wind turbine comprising a rotating assembly attached to a central hub, which is supported for rotation in a horizontal plane about a vertical axis, in a bearing on top of a tower of selected elevation. The rotating assembly comprises at least two radial spokes or arms positioned from each other at equal angles in a horizontal plane. The outer ends of the arms are attached to a connector assembly which generally is in the form of a U-shaped member lying in a vertical plane. A long thin vertically oriented airfoil is mounted on the ends of each connector, the plane of the chord of the airfoil is perpendicular to the axis of the arm which supports it. A torque shaft is attached at the axis of the hub and passes axially downwardly through the tower to an energy conversion device mounted in a housing on the base, which supports the tower. The tower may be guyed by means of cables, etc. which are attached below the level of the rotating assembly. Means are provided for using wind power to bring the rotating assembly up to a selected operating speed. Braking vanes are provided to limit the top speed of rotation of the assembly.

16 Claims, 17 Drawing Figures

VERTICAL AXIS WIND TURBINE

BACKGROUND OF THE INVENTION

This invention is related in general to the conversion of kinetic wind energy into rotary shaft power. More particularly, it concerns the structural problems of vertical axis windmills.

The advantage of a structurally stable vertical axis windmill, as compared, for example, to the standard horizontal axis windmill, is that no steering mechanism sensitive to wind direction is needed, and therefore, no gearbox at the top of the supporting tower is needed.

Previous designs of vertical axis windmills generally fall into one of three categories, i.e., the giromill, the Savonius rotor, and the Darrieus rotor. The giromill is a carousel-shaped structure having vanes which automatically orient themselves in favorable relations with respect to the wind direction. The Savonius rotor is essentially a pair of opposing half-cylinders, which are offset from the vertical supporting axis in an S-shaped configuration, so as to utilize the difference between the wind force acting against a convex surface and the wind force acting against a concave surface. The giromill and the Savonius rotor are inherently inefficient because of their necessarily slow rotational speeds.

The conventional Darrieus rotor is essentially a thin hoop whose diameter constitutes a vertical axis of rotation. The cross-section area of the long continuous ribbon forming the hoop has the profile of a symmetrically streamlined airfoil. For each of the two half-hoops attached to the vertical axis of rotation, the blunt leading edge of the airfoil-shaped ribbon is oriented so as to head into the relative airflow caused by rotation of the hoop about its verticalized diameter.

The airfoil chord length, i.e. the ribbon width, is typically equal to about 10 percent of the hoop radius, and the airfoil thickness is typically equal to about 12 percent of the chord. Because the hoop is not self-starting, an auxiliary power source is required to bring the rotor up to operational speed. Optimum power is extracted from the wind when the tangential velocity of the outermost sectors of the hoop is typically 4 to 6 times the ambient wind speed. The energy conversion efficiency of this type of windmill is theoretically expected to be in the range of 30 to 40 percent.

The most difficult problem encountered in implementing the conventional Darrieus rotor concept stems from its requirement of a vertical axis which is tall, slender, and rigid. One approach to this problem has been to extend the required vertical shaft upward from a pair of bearings located in the top and bottom of a heavy gearbox mounted on a sturdy ground base. Such a configuration puts the center of mass excessively high above the center of support. Another approach has been to make the hoop supporting shaft hollow so as to fit, with the aid of an upper-end bearing and a lower-end bearing, over a vertical flagpole-type shaft which extends upward from a sturdy ground slab to a high top plate from which guy wires slant downward and outward far enough to clear the hoop. Such a configuration introduces a noxious visual appearance and has the disadvantage of requiring an excessively large base to accommodate the guy-wire anchoring points.

SUMMARY OF THE INVENTION

It is a primary object of this invention to provide a vertical axis windmill system having a rotating assembly of vertical airfoils in a configuration which places the inertial center, the aerodynamic center, and the support center all at the same point, which is on the axis of the rotating assembly.

It is a further object of this invention to provide a vertical axis windmill structure which can be guyed from positions below the level of the rotating assembly.

It is a still further object of this invention to provide a vertical axis windmill structure in which the rotational torque is derived from a plurality of vertical airfoils having their planes at right angles to the radius of the rotating assembly.

It is a further object to provide means whereby the airfoil support structure can be rotated with respect to the radial support arms to feather the airfoils so as to prevent rotation.

It is a still further object of this invention to provide a vertical axis windmill structure including startup vanes which can be used to drive the rotating assembly up to a selected operating speed, at which time the wind derived torque is sufficient to maintain its velocity under load.

It is a still further object of this invention to provide a vertical axis windmill with braking vanes, which can be oriented to limit the top rotational speed of the assembly.

These and other objects are realized and the limitations of the prior art are overcome in this invention by providing a tower structure of selected height supported on a base of selected diameter, which rests on the earth.

The rotating structure comprises two or more radial arms, equally spaced circumferentially, in a horizontal plane, attached to a central hub, which is supported on the tower in suitable bearings. Connector structure is provided at the end of each arm, which supports an elongated airfoil of rectangular shape, mounted vertically, with the plane of the chord of the airfoil perpendicular to the axis of the arm. The leading edges of the airfoils are directed in the intended direction of rotation of the windmill rotating structure.

A torque member is attached coaxially to the central hub and extends downwardly to an energy conversion means which can be of any desired type, such as, for example, an electrical generator, or similar device, as is well known in the art.

Means are provided also to attach movable streamlined vanes which can be placed in position to act as drive vanes, by means of which the wind can be used to bring the rotor up to an operating speed, where the torque generating action of the airfoil takes over, to maintain the speed and supply an output torque. Also, it is possible to attach vanes which under unusually high wind velocity provide a drag such as would limit the upper speed of the rotating assembly.

Locked hinged devices are provided by means of which the support connector and airfoil can be rotated about an axis attached to the ends of the arms, so as to take the airfoils out of the position which generates a torque. This feathering of the airfoil to provide zero torque output is used under extremely high wind velocity conditions.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

Figure 1:
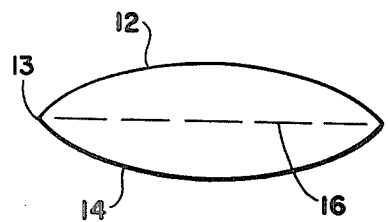
FIG. 1 shows the lens shaped cross-section of a bidirectional streamlined form, needed for the structural support components of this invention.

From elementary considerations it will be seen that any horizontal beam or strut in the rotating portion of the vertical axis windmill will, if near the axis of rotation, encounter a relative airflow which cyclically reverses in direction. Such a beam or strut, as well as any circumferential support ring, should therefore have a cross-section similar to the bidirectional symmetric streamline form shown in FIG. 1. This shape has top 12 and bottom 14 surfaces, symmetrical about the plane 16 of the chord. Flexural strength against bending and torsion forces can, of course, be provided by means of suitable load-bearing structural members located inside this bidirectional streamline covering or fairing.

Figure 2:
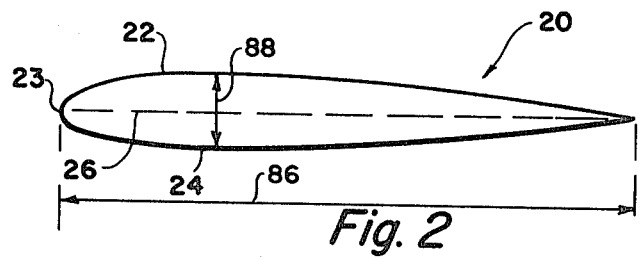
FIG. 2 shows the cross-section of a symmetric airfoil used as the torque producing components of this invention.

Various experiments have confirmed the Darrieus principle that if at the end of a crank arm reaching horizontally from a vertical axis of rotation, a long thin symmetric airfoil is attached to extend upward with its chord perpendicular to the arm axis and with its leading edge facing tangentially forward; and if thereby the airfoil is moved continuously around its circular path at high speed, the effect of any wind will be to deliver energy into the crank in the form of cyclic torque pulses. If the circumferential speed V of the airfoil is significantly more than the wind speed W, the effective angle of attack of the moving airfoil will vary sinusoidally between plus and minus W/V radians. The corresponding tangential component of lift, minus the airfoil drag, is the useful force extracted from the wind. The airfoil shape giving a good lift-to-drag ratio for this purpose is one approximating the NACA 0012 airfoil, which is shown in FIG. 2. Here again, the top 22 and bottom 24 surfaces are symmetrical about the plane 26 of the chord. The blunt end 23 faces in the direction of rotation.

As noted previously, the main difficulties encountered heretofore in attempts to implement the Darrieus rotor concept have been in devising functionally adequate airfoil suspension and rotor support systems.

Figure 3:
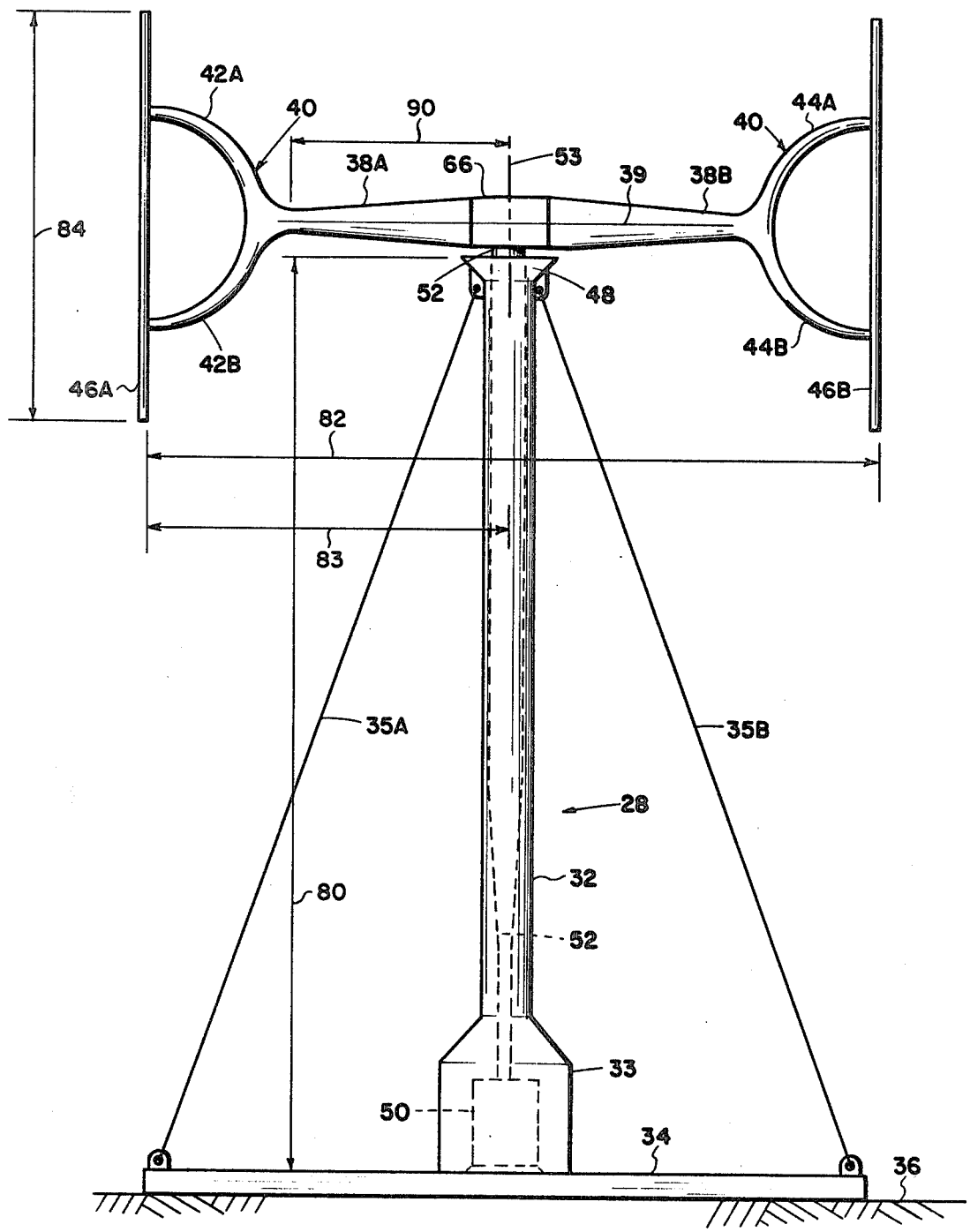
FIG. 3 shows the primary features of the vertical axis windmill of this invention.

Turing now to FIG. 3, it is seen that the vertical-axis windmill of this invention has a tower portion 28 consisting of a base 34 upon the center of which is erected a small equipment housing 33 of sturdy construction. A rigid hollow supporting pipe 32 of circular cross-section extends from the top of the housing 33 upward to a bearing ring 48 which supports the rotating portion of the windmill. In order to stabilize the vertical tower 32, several guy wires, two of which are designated 35A and 35B, slant downward from the bearing ring 48 to appropriate anchor points distributed around the periphery of the base 34. The base 34 rests on the earth 36.

Inside the housing 33 is an energy converter 50, such as a geared generator or an air compressor, driven by a shaft 52 which is housed by the supporting pipe 32, and which extends upward through the bearing ring 48. Just above the bearing ring 48, the drive shaft 52 terminates in the center of a hub 66, from which two or more cantileverd beams or arms 38A, 38B extend radially outward, like the spokes of a wheel. The several beams are identical to each other and are spaced apart by equal angles around the hub 66. Each beam, such as beam 38A, 38B has a radially decreasing cross-section area, which is shaped proportionally, like the bidirectional streamlined form of FIG. 1.

At the outermost ends of the typical arms 38A, 38B there are rigidly attached airfoil assemblies which comprise a straight vertical airfoil element 46A, 46B plus a connecting curved airfoil segment 40. Both of these airfoil segments 40, 46 have the cross-sectional shape of the symmetrical airfoil of FIG. 2, both have the same chord length, both have their blunt leading edges facing in the same rotational direction, and both are interiorly fitted with equally spaced twin parallel spars or fingers 42A, 42B, and 44A, 44B. The length of the straight airfoil segments 46A, 46B is twice the diameter of the semicircular, curved airfoil segments 40. The two spars 44A, 44B in the curved airfoil segment 40 have the general form of two parallel half circles, and their ends are attached perpendicularly to the straight airfoil segments 46A, 46B at points which make the central half of the straight airfoil segments 46 span the diameter of the semicircular airfoil connector segment 40.

The above-described airfoil assembly 40, 46 is fitted to the arm 38 with the straight segment 46 aligned vertically, and with the curved segment 40 having its convex surface facing radially inward, with the midpoints of its twin semicircular spars or fingers attached rigidly to the end of the beam 38. The airfoil assemblies for all arms or beams are similarly fitted, with the blunt leading edges of all the airfoils facing in the same rotational direction. Airflow disturbances which might develop in sharp corner regions can be avoided by judicious use of standard low-curvature fairings.

Performance date for the vertical axis wind turbine illustrated in FIG. 3 can be calculated from a specific set of numerical values. For example, these values may be those associated with a three-arm rotor, a 70 ft. tower height 80, a 60 ft. rotor (airfoil) height 84, a 110 ft. rotor diameter 82, a 30 inch airfoil chord 86, a 3.6 inch airfoil thickness 88, a 34 mph wind, a 37 percent conversion efficiency, and a rotor circumferential-speed to wind-speed ratio of 5 to 1. For these parameter values, the wind intercept area is 6,600 sq. ft., the power output is 492 kw, the shaft speed is 43.4 rpm, the output torque is 79,860 ft. lb., and the centrifugal acceleration of the outermost rotor components (i.e., the vertical airfoils) is 1,136 ft/sec.$^2$. The effect of reducing both the rotor size and the wind speed may be found by assuming a rotor (airfoil) height of 30 ft., a rotor diameter of 55 ft., a 15 inch airfoil chord, a 1.8 inch airfoil thickness, and a wind speed of 17 mph. In this case the wind intercept area is 1,650 sq. ft., the power output is 15.4 kw, the shaft speed is still 43.4 rpm, the output torque is 2,698 ft. lb., and the centrifugal acceleration of the outermost rotor components is 568 ft/sec$^2$.

Several particular features of the windmill of FIG. 3 may now be noted. First, it will be seen that the typical vertical airfoil 46B is supported, with perpendicular attachments 44A, 44B at the 25 percent and 75 percent stations along its length. This method of support evenly balances the centrifugal forces, as well as the aerodynamic forces, acting on the airfoil. Second, the curved mechanical connection 40 between the vertical airfoil 46 and the streamlined support beam 38 is itself a streamlined airfoil having, with a thickened mid-section, if desired, an interior frame strong enough to resist both kinetic and aerodynamic forces. Relative to the radius of curvature of connector airfoil 40, the arm 38 is made long enough to ensure that no part of the curved airfoil is stalled when the straight airfoil 46 is moving at a typical circumferential speed of five times the ambient wind speed, i.e., the length 90 of arm 38 is made to be at least 75 percent of the radius 83 of the airfoil 46. Third, it will be seen that the design of the rotor structure is one which readily permits the addition of other desirable components, such as overspeed braking vanes and an automatic start-up assembly.

Figure 4A:
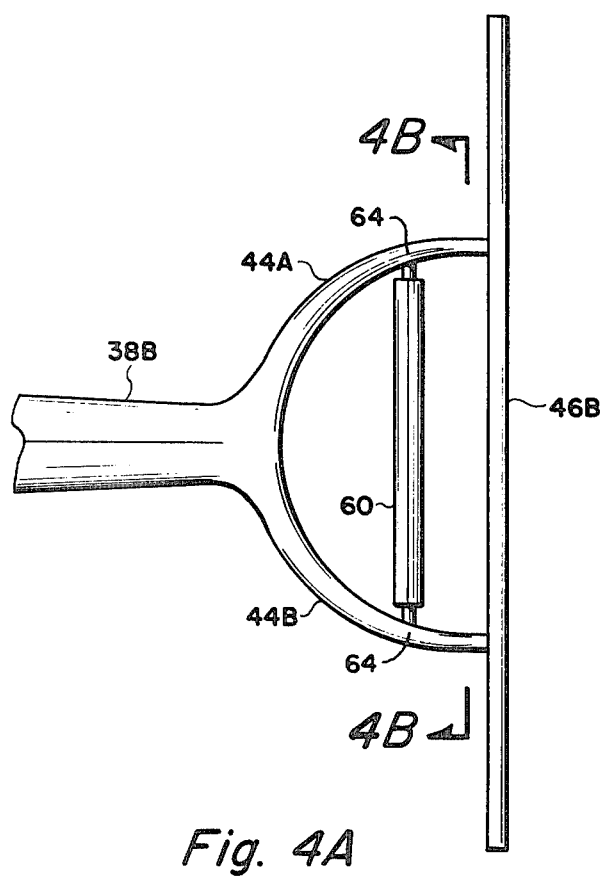
FIGS. 4A and 4B show two views of braking or drag vanes, which are used to provide a drag to the rotation of the windmill assembly as needed.
Figure 4B:
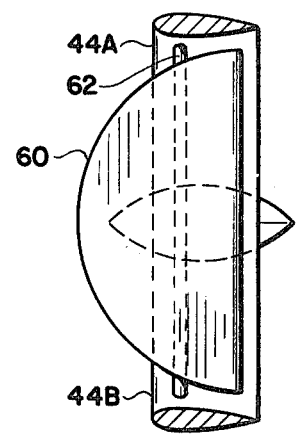
Figure 5A:
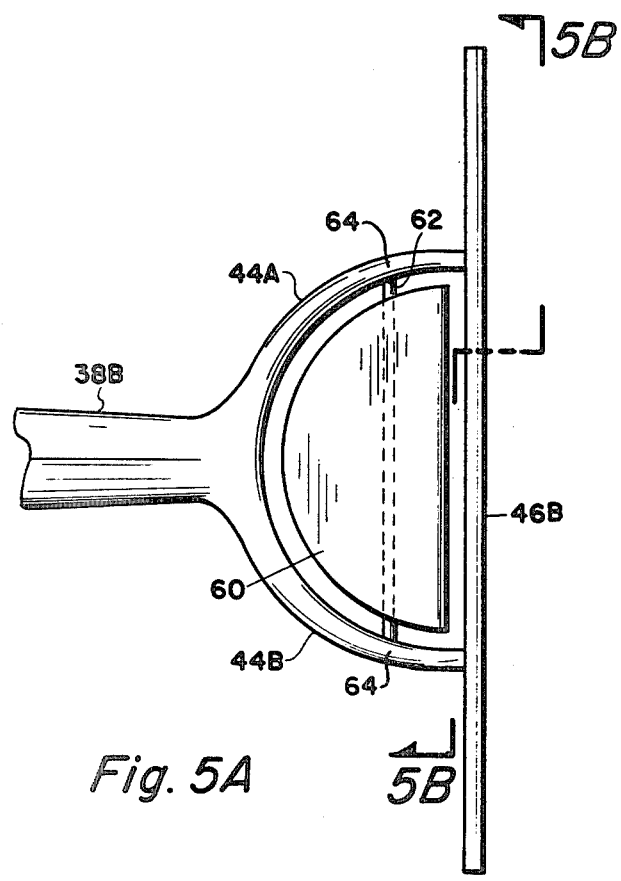
FIGS. 5A and 5B show two views of the drag vanes in their operating position.
Figure 5B:
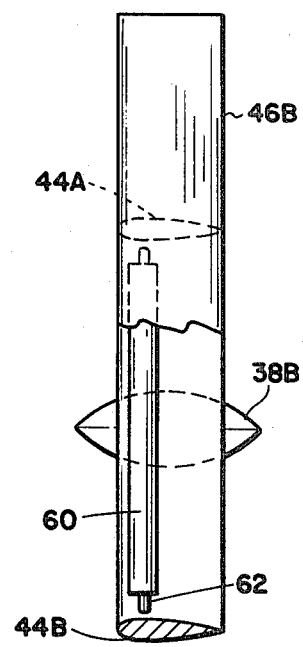

Turning now to FIGS. 4A, 4B, 5A, 5B, it will be seen that four different views of an overspeed braking vane 60 are shown in relation to the typical rotor arm 38, and its associated curved airfoil connector segment 40. FIGS. 4A and 4B show, respectively, the tangential and radial views when the vane 60 is oriented in the non-braking position. Conversely, FIGS. 5A and 5B show the tangential and radial views when the vane 60 is oriented in the maximum braking position.

In the particular embodiment shown in FIGS. 4A, 4B, 5A, 5B, the overspeed braking vane 60 has the general shape of a rather thin half-disc which stands in a rotatable vertical plane and which, in the full braking position, fits with suitable clearance within the area bounded by the concave side of the curved connector airfoil 40, and the opposing mid-half of the straight airfoil 46. The vane 60 is supported in an aerodynamically balanced manner by means of a pinned vertical shaft 62 passing through its centroid. The upper and lower ends of the shaft 62 are supported by suitable bearings indicated by numerals 64, anchored in the upper and lower arms 44A, 44B of the curved airfoil 40. Rotation of the vertical shaft 62 is limited to a maximum of 90 degrees by means of suitable stops, not shown.

Rotation of the shaft 62 and its attached braking vane 60 may be controlled by any means which assures the orientation of FIG. 4A at normal rotor speeds, and an orientation approaching that of FIG. 5A at excessive rotor speeds. Simple automatic orientation can be achieved by use of a coiled spring (now shown) at the upper end of shaft 62 to hold vane 60 in the position of FIG. 4A for low rotor speeds, and by use of a mass-terminated crank arm at the lower end of shaft 62 to rotate vane 60 to the position of FIG. 5A whenever the speed-dependent centrifugal force substantially exceeds the predetermined spring force.

In the general case in which there is an overspeed braking vane at the end of each rotor beam 38, the angular orientations of the several vanes can be coordinated by use of an auxiliary crank arm at the center of each vane shaft, plus an attached long push-rod extending centrally inside each beam, plus a suitable array of interconnecting linkages located inside the hub 66. By means of a second collective linkage inside hub 66, plus a long push-rod extending downward through the hollow drive shaft 52, the rotor speed can be further controlled from a convenient location near the energy converter 50.

Naturally, the braking vane 60 need not have exactly the same shape and position as the one shown in FIGS. 4A, 4B, 5A, 5B. For example, the vane shaft 62 could be offset from the vane centroid if desired for smoother automatic control of rotor speed. Further, the vane 60 could be made smaller and could be shaped like a rectangular weathervane. Still further, by removing the mid-section of vane 60, the entire vane and shaft assembly could be relocated to the convex side of the curved airfoil 40, with the mid-segment of shaft 62 extending vertically through the rotor beam 38. Also, the braking vanes 60 could be rectangular vanes hinged to those beams about a substantially horizontal axis, such as those illustrated in FIG. 6.

Figure 6:
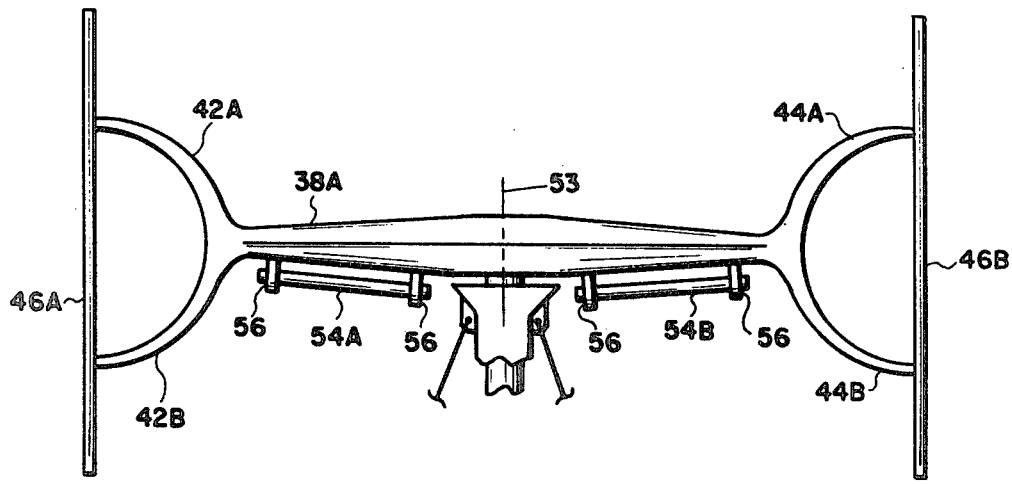
FIG. 6 illustrates a portion of FIG. 1 with the addition of start-up vanes, for the purpose of providing initial low velocity torque to bring the rotor up to an operating speed, such that the airfoils can produce operating torque.

Turning now to FIGS. 6, 7A, 7B, 8A, 8B, it is seen that the self-starting mechanism is illustrated schematically by an overall view represented in FIG. 6, plus close-up views represented by FIGS. 7A, 7B, 8A, 8B. Attached to the underside of the typical arm 38 are two radially separated bearing fixtures 56 supporting the two ends of a nearly horizontal shaft 58 which extends in the radial direction along the underside of the arm 38. Between the two bearing fixtures 56, the diameter of the shaft 58 is enlarged somewhat to serve as the blunt leading edge of a streamlined vane 54. In the particular illustration of FIGS. 8A, 8B, the plan-form of the vane 54 is shown to be rectangular, i.e., the sharp trailing edge of the vane 54 is parallel to the blunt leading edge. The vane 54 may typically have a width equal to about 30 percent of its length, and a length equal to about half that of arm 38.

Figure 7A:
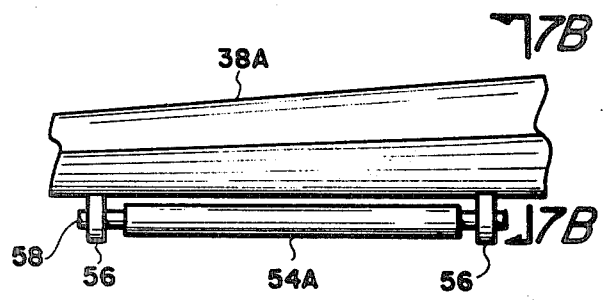
FIGS. 7A and 7B show two views of the rotational starting vanes in their feathered position.
Figure 7B:
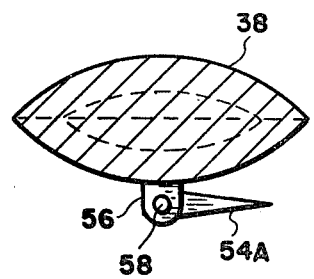
Figure 8A:
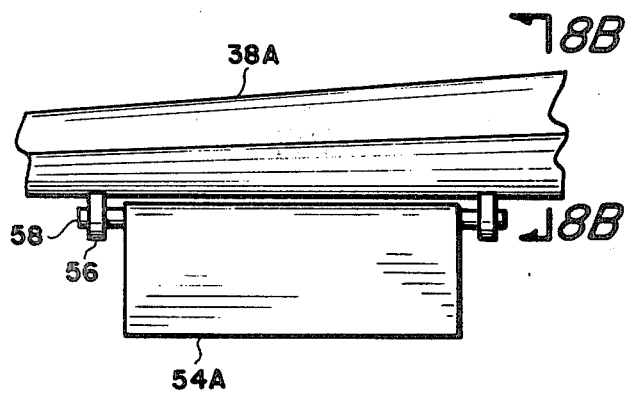
FIGS. 8A and 8B illustrate the start-up vanes in their operating position, to provide a rotational torque.
Figure 8B:
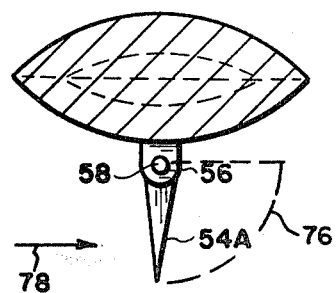

In the no-wind condition, the rotor arm 38 is stationary, and the force of gravity causes the vane 54 to hang downward, as shown in FIGS. 8A, 8B. By use of suitable angular stops, this down-hanging vane position is made to be the first of two extreme limits of rotation of shaft 58, the second being the 90 degree foldback position shown in FIGS. 7A, 7B.

In the early start-up condition in which there is a build-up of wind well in advance of a corresponding buildup of rotor rotation, any significant wind blowing from one of the two directions perpendicular to the arm 38 will produce an aerodynamic drag force against the corresponding one of the two sides of the down-hanging vane 54. If this wind blows against the first side in accordance with arrow 78 of FIG. 8B, the vane 54 will yield rotationally by swinging upward 76 toward the 90 degree foldback position shown in FIG. 7B, with the result that only a minimal horizontal force will be exerted on the arm 38. Conversely, if the wind blows from the opposite direction, i.e., against the second side of the vane 54, the aforementioned angular stops will prevent the vane 54 from yielding rotationally, and the resultant drag force will be transmitted to the arm 38.

Thus, if the windmill rotor structure includes three or more arms, each like arm 38, and each fitted with a pendulous vane 54 of limited rotation as described above and illustrated in FIGS. 7A, 7B, 8A, 8B, the rotor will automatically start turning as soon as a significant wind builds up, regardless of the wind direction. The direction the rotor turns during start-up is predetermined by the choice of the quadrant allowed for rotation of the typical vane 54.

During the latter phase of the automatic start-up operation the rotor airfoils begin to produce additional torque which, if not too strongly opposed by the load reaction torque of the energy converter 50 during that time, will bring the rotor up to its normal operating speed. With the outermost half of the typical start-up vane 54 being far enough away from the rotor hub 66 to ensure unidirectional relative airflow at normal rotor speed, each of the start-up vanes will thereafter be dynamically held in the 90 degree foldback position shown in FIGS. 7A, 7B. Consequently, after the start-up phase is completed and the rotor is delivering power at normal speed, the parasite drag of the start-up vanes will be small.

Figure 11:
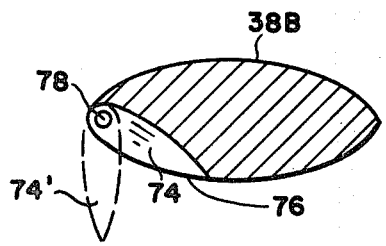
FIG. 11 illustrates an improved shape of start-up vane for initiating the rotation of the assembly.

It is, of course, apparent that the start-up mechanism illustrated by FIG. 6 is represented in its simplest form, for descriptive purposes only. Numerous refinements may be added, the first of which may be a rotary shock absorber for the typical vane 54. Another improvement would be to locate the typical vane shaft 58 just ahead of the leading edge of its associated arm 38, and to curve the vane 54 so as to make it better fit the leading half of the undersurface of arm 38 during full-speed rotor operation. This is illustrated schematically in FIG. 11 where the vane 74 has a surface 76 which forms part of the undersurface of arm 38. The downhanding position is shown as 74' after rotation about hinge 78.

Still another improvement would be to connect a centrifugal weight through a suitable linkage to the outermost end of the typical shaft 58 to assist in holding the associated vane 54 in its 90 degree foldback position as in FIGS. 7A, 7B during full-speed rotor operation. This latter concept could readily be extended with the aid of an over-the-center mechanical trigger, to automatically trip and lock the typical start-up vane 54 into a down-hanging braking position when the rotor speed becomes excessive, thus converting it to a braking vane.

Returning now to FIG. 3, several additional observations may be made with respect to the overall structural design of the vertical axis wind turbine of this invention. First, it is seen that the rotor design is such that the highly desirable location of the rotor-supporting bearing ring 48 near the center of mass of the rotor is realized. Second, it is seen that the overall design is such that smooth airflow through the rotor is not seriously disturbed by non-aerodynamic structural elements. Third, the rotor structure will readily accommodate additional struts or cables. One such modification would be to counteract any gravitational drooping of very long rotor arms by use of a faired guy wire sloping upward from the outermost end of each beam to a vertical extension of the rotor shaft 52 above the hub 66. Another example would be to counteract any beam torsion oscillations by interposing an eyelet-terminated beam between every airfoil beam and connecting a guy wire between every eyelet and the top ends of the vertical airfoils of the two neighboring beams, and then connecting a guy wire between every eyelet and the bottom ends of the vertical airfoils of the two neighboring beams.

Finally, in addition to the self-starting and overspeed control mechanisms previously described, the rotor structure illustrated in FIG. 3 will also accommodate an airfoil feathering mechanism for severe storm protection. For example, the airfoil assembly may be rotatably connected to its associated rotor beam 38 by means of a sturdy hinge joint. If the hinge pin is oriented vertically, the associated airfoils can be swung into a feathering position with respect to the wind. Alternatively, if the hinge pin is oriented horizontally, the normally vertical airfoil 46 can be swung upward or downward into a horizontal position and locked for the duration of the storm.

Figure 9B:
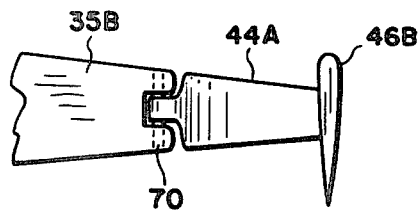
FIGS. 9A and 9B illustrate the use of a lockable horizontal hinge means for feathering the airfoils under conditions of very high wind velocity.
Figure 9A:
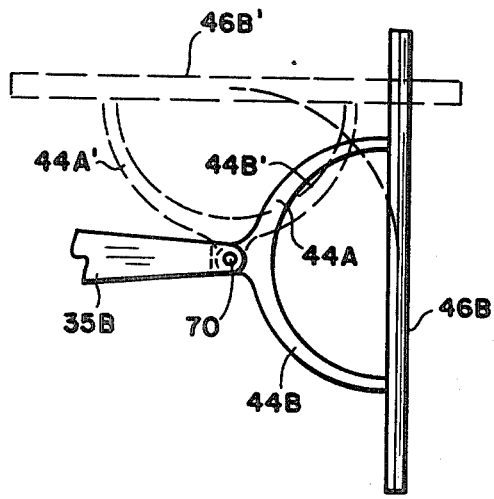

Referring now to FIGS. 9A and 9B, there is shown a modification of FIG. 3 and in particular the end of arm 38B, connector 44A, 44B, and airfoil 46B. Whereas in FIG. 3 the arm and the connector means were shown as a single structural member, in FIGS. 9A and 9B these have now been hinged together with horizontal hinge pin 70. By means not shown but well understood in the art, cable or operating rod means can be provided to rotate the connector 44A, 44B counterclockwise, to the position shown in dashed outline and indicated by 44A', 44B', and 46B'. In this position the airfoil 46B is no longer effective in developing torque, and consequently, there is no rotational torque provided when the airfoil is locked in this horizontal position. Under extremely high wind conditions in order to prevent damage to the structure, the airfoils would be feathered by rotation in the manner indicated in FIG. 9A.

Figure 10B:
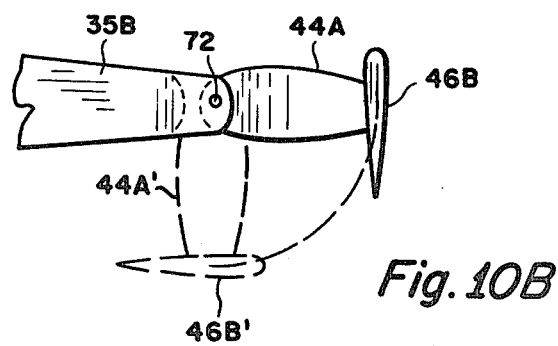
FIGS. 10A and 10B illustrate a lockable vertical hinge means for feathering the airfoils under conditions of very high wind velocity.
Figure 10A:
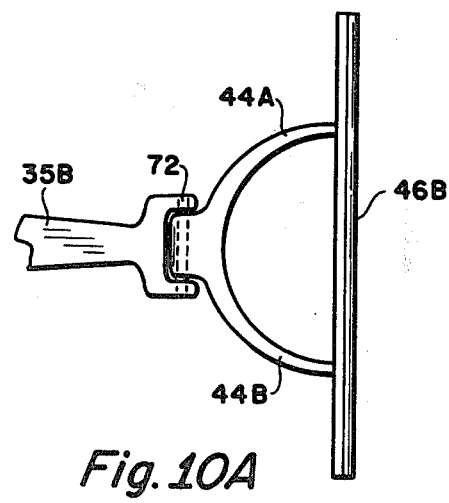

In FIGS. 10A and 10B, there are shown two views of another system by which the airfoil structure and connector can be hinged—this time with a vertical hinge pin 72. FIG. 10B shows the connector 44A and the airfoil 46B rotated clockwise into a position shown by dashed outline. Here again, with the airfoil in a vertical position with the plane of its chord radial, there is no way that torque can be developed and even under high wind velocities the structure will not rotate and thus will be protected from injury under high wind conditions.

What has been described is a vertical axis windmill rotor which has good structural strength, offers a minimum resistance to airflow, and has the inertial center, aerodynamic center, and the support center all at the same point. In this structure the supporting tower can be a thin cylindrical member which is anchored to a base and can be guyed by tension members attached to points on the tower below the bearing, which supports the hub and arms of the rotating windmill structure.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element thereof is entitled.

What is claimed is:
1. A vertical axis wnd turbine, comprising;
  (a) a tower structure of selected height H, supported on a base of diameter D, resting on the earth;

(b) a rotating structure having a central hub rotatable on bearing means at the top of said tower, and torque drive means extending from said hub means, down inside of said tower structure to energy control means on said base;

(c) at least two streamlined radial arms, circumferentially equally spaced, and equal in selected length L, extending in a horizontal plane, and wherein each arm is streamlined with its chord plane being horizontal;

(d) a high speed vertical airfoil of selected vertical extend E, attached to the outer end of each radial arm, each airfoil being identical, the chord plane of each airfoil perpendicular to the axis of the arm to which it is attached; and (e) the outer end of each arm is attached to a U-shaped connector, the two fingers of the U-shaped connector being in a vertical plane, and attached to said vertical airfoil at points E/4 from each end;

whereby the inertial center, the aerodynamic center, and the support center are all at the center of rotation of said hub.

2. The wind turbine as in claim 1 in which there are more than two radial arms and vertical airfoils.

3. The wind turbine as in claim 1 in which said fingers of said connector are stremlined and are extended in the form of a semicircle.

4. The wind turbine as in claim 1 in which the diameter of said base is no greater than the diameter of the circle of rotation of said vertical airfoils.

5. The wind turbine as in claim 1 in which said tower is a cylindrical tube supporting on a housing on said base, and guyed by means attached to the tower below the rotating assembly.

6. The wind turbine as in claim 1 including lockable hinge means between the end of each arm and its corresponding U-shaped connector;

whereby said vertical airfoil can be rotated into a feathered position.

7. The wind turbine as in claim 6 in which the axis of said hinge is vertical.

8. The wind turbine as in claim 6 in which the axis of said hinge is horizontal.

9. The wind turbine as in claim 1 including at least one start-up vane attached to the underside of each streamlined radial arm.

10. The wind turbine as in claim 9 in which said start-up vane comprises a streamlined vane hinged to said structure and adapted to rotate through an angle from the plane of rotation at right angle thereto.

11. The wind turbine as in claim 10 in which said vane is hinged near its leading edge to the underside of said arm.

12. The wind turbine as in claim 1 including at least one overspeed braking vane, attached to each subassembly comprising one arm, one connector, and one airfoil.

13. The wind turbine as in claim 12 in which said braking vane comprises a streamlined vane hinged to said sub-assembly by means of a vertical shaft and adapted to rotate through an angle of ninety degrees about a vertical axis.

14. The wind turbine as in claim 11 in which said vane is hinged about an axis parallel to its leading edge and substantially parallel to said arm.

15. The wind turbine as in claim 13 in which said vane is shaped to fit within the U of said connector, and to rotate about a vertical axis between the two fingers of said U.

16. The wind turbine as in claim 1 in which the length of the arm is at least 70 percent of the radius of the vertical airfoil.

* * * * *